US010717421B2

(12) United States Patent
Chen et al.

(10) Patent No.: US 10,717,421 B2
(45) Date of Patent: Jul. 21, 2020

(54) BRAKING FORCE DISTRIBUTION METHOD AND SYSTEM OF MULTIPLE TRAIN UNITS

(71) Applicants: CRRC ZHUZHOU INSTITUTE CO., LTD., Zhuzhou, Hunan (CN); ZHUZHOU CRRC TIMES ELECTRIC CO., LTD., Zhuzhou, Hunan (CN)

(72) Inventors: Wenguang Chen, Hunan (CN); Jing Shang, Hunan (CN); Xiong Liu, Hunan (CN); Chaolu Chen, Hunan (CN); Junfeng Xu, Hunan (CN); Huishui Peng, Hunan (CN); Hua Xiao, Hunan (CN); Wei Li, Hunan (CN); Bin Zhang, Hunan (CN); Long Wang, Hunan (CN); Anhui Ji, Hunan (CN)

(73) Assignees: CRRC ZHUZHOU INSTITUTE CO., LTD., Zhuzhou, Hunan (CN); ZHUZHOU CRRC TIMES ELECTRIC CO., LTD., Zhuzhou, Hunan (CN)

( * ) Notice: Subject to any disclaimer, the term of this patent is extended or adjusted under 35 U.S.C. 154(b) by 0 days.

(21) Appl. No.: 15/580,686

(22) PCT Filed: Jun. 28, 2016

(86) PCT No.: PCT/CN2016/087442
§ 371 (c)(1),
(2) Date: Dec. 8, 2017

(87) PCT Pub. No.: WO2017/005112
PCT Pub. Date: Jan. 12, 2017

(65) Prior Publication Data
US 2018/0186351 A1 Jul. 5, 2018

(30) Foreign Application Priority Data
Jul. 9, 2015 (CN) .......................... 2015 1 0399919

(51) Int. Cl.
*B60T 8/00* (2006.01)
*B60T 8/17* (2006.01)
(Continued)

(52) U.S. Cl.
CPC ............ *B60T 8/1705* (2013.01); *B60T 8/171* (2013.01); *B60T 8/1766* (2013.01);
(Continued)

(58) Field of Classification Search
CPC .................................................. B60T 8/1705
See application file for complete search history.

(56) References Cited

U.S. PATENT DOCUMENTS 4,692,867 A 9/1987 Poole
5,823,638 A 10/1998 Sich et al.
(Continued)

FOREIGN PATENT DOCUMENTS

CN 101389513 A 3/2009
CN 102333687 A 1/2012
(Continued)

OTHER PUBLICATIONS

International Search Report for PCT/CN2016/087442, dated Oct. 10, 2016, ISA/CN.

*Primary Examiner* — Truc M Do
(74) *Attorney, Agent, or Firm* — Yue (Robert) Xu; Apex Attorneys at Law, LLP

(57) ABSTRACT

A braking force distribution method and system for multiple marshalling train compartments are provided. The method includes: determining a current train compartment of multiple target marshalling train compartments, calculating current axel loads of axels of the current train compartment, and distributing braking forces for the axels of the current train compartment in a positive correlation manner based on the current axel loads of the axels. The braking forces of the
(Continued)

axels are distributed by using an axel load compensation technology. A braking force generated by an axle with a small axle load is reduced according to a load-decreasing amount of the axle load, while a braking force generated by an axle with a great axle load is increased according to a load-increasing amount of the axle load, so that the braking forces generated by the axles match the axle loads.

4 Claims, 4 Drawing Sheets

(51) Int. Cl.
    *B60T 8/1766* (2006.01)
    *B60T 8/30* (2006.01)
    *B60T 8/18* (2006.01)
    *B60T 8/171* (2006.01)
    *B61L 3/00* (2006.01)
    *B61L 15/00* (2006.01)

(52) U.S. Cl.
    CPC .............. *B60T 8/1893* (2013.01); *B60T 8/30* (2013.01); *B61L 3/006* (2013.01); *B61L 15/0072* (2013.01)

(56) References Cited

U.S. PATENT DOCUMENTS

| | | | |
|---|---|---|---|
| 8,942,869 B2 * | 1/2015 | Woo | B61L 3/127 246/4 |
| 9,045,123 B1 * | 6/2015 | Cooper | B60T 17/228 |
| 9,379,775 B2 * | 6/2016 | Cooper | H04B 3/54 |
| 9,513,630 B2 * | 12/2016 | Rajendran | B61L 15/0027 |
| 9,637,147 B2 * | 5/2017 | Golden | B61L 15/0072 |
| 9,689,681 B2 * | 6/2017 | Napolitano | G01C 21/00 |
| 9,733,625 B2 * | 8/2017 | Kumar | B61L 3/006 |
| 9,828,010 B2 * | 11/2017 | Otsubo | B61L 3/006 |
| 9,950,722 B2 * | 4/2018 | Kumar | B61L 27/0027 |
| 10,144,440 B2 * | 12/2018 | Cooper | B61L 15/0081 |
| 2005/0017577 A1 | 1/2005 | Eckert et al. | |
| 2007/0225896 A1 * | 9/2007 | Steimel | B60T 8/1766 701/124 |
| 2008/0051967 A1 * | 2/2008 | Tarnow | B60L 3/10 701/71 |
| 2008/0059112 A1 * | 3/2008 | Hawkins | B60L 3/102 702/148 |
| 2008/0128562 A1 * | 6/2008 | Kumar | B61C 17/12 246/186 |
| 2008/0161984 A1 * | 7/2008 | Hrdlicka | B61L 3/006 701/20 |
| 2009/0273232 A1 | 11/2009 | Barlsen et al. | |
| 2010/0175580 A1 * | 7/2010 | Gorski | B61F 5/36 105/157.1 |
| 2010/0235022 A1 * | 9/2010 | Siddappa | B61C 17/12 701/20 |
| 2011/0082606 A1 * | 4/2011 | Kumar | B61C 15/04 701/19 |
| 2011/0231039 A1 | 9/2011 | Leitel et al. | |
| 2012/0049478 A1 * | 3/2012 | Ahuja | B61F 5/36 280/124.101 |
| 2012/0049479 A1 * | 3/2012 | Kalyani | B61F 5/36 280/124.101 |
| 2012/0049481 A1 * | 3/2012 | Ahuja | B61C 15/14 280/124.164 |
| 2014/0180555 A1 | 6/2014 | Eckert et al. | |
| 2014/0316618 A1 * | 10/2014 | Matthews, Jr. | B60L 15/38 701/19 |

FOREIGN PATENT DOCUMENTS

| | | |
|---|---|---|
| CN | 102348572 A | 2/2012 |
| CN | 105015524 A | 11/2015 |
| DE | 19904216 A1 | 1/2000 |
| DE | 102008022026 A1 | 11/2009 |
| EP | 1433681 A1 | 6/2004 |
| EP | 2261095 A2 | 12/2010 |
| EP | 2261095 A3 | 7/2014 |
| WO | 2006010505 A2 | 2/2006 |
| WO | 2006010505 A3 | 2/2009 |

* cited by examiner

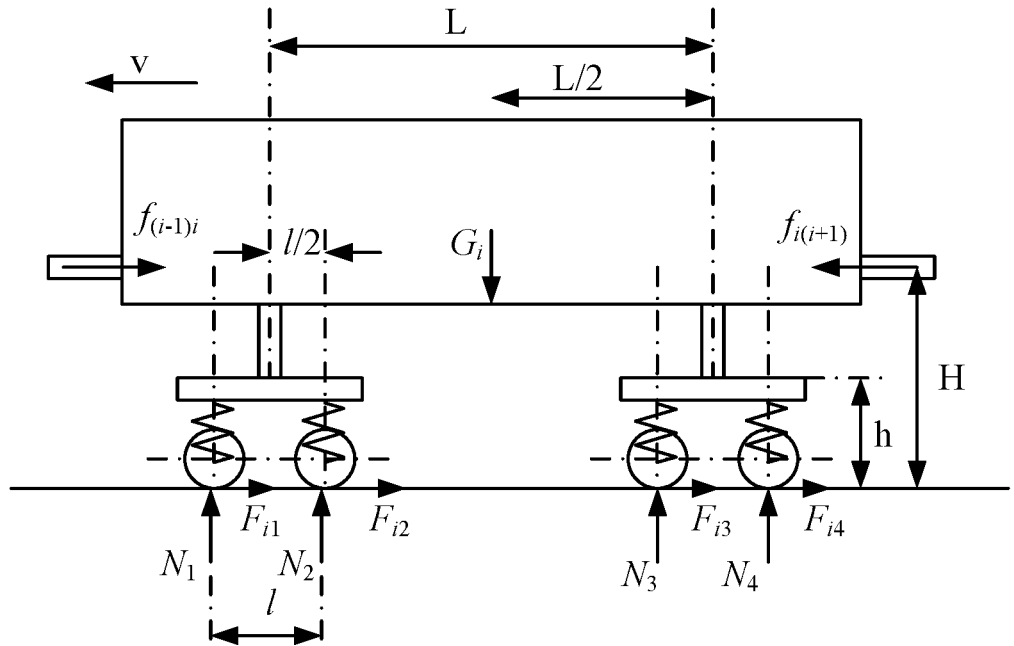

Figure 2

```
┌─────────────────────────────────────────────────┐
│ Calculate a front coupler acting force, a rear coupler acting │
│ force and gravity of the current train compartment based on  │─── S301
│  mass, a current acceleration, a current resistance and a    │
│   current braking force of the current train compartment     │
└─────────────────────────────────────────────────┘
                           │
                           ▼
┌─────────────────────────────────────────────────┐
│   Calculate axle load transfer of four axles of the current  │
│  train compartment respectively based on the front coupler   │─── S302
│  acting force, the rear coupler acting force, the gravity and│
│   the structure dimension of the current train compartment   │
└─────────────────────────────────────────────────┘
```

Figure 3

BRAKING FORCE DISTRIBUTION METHOD AND SYSTEM OF MULTIPLE TRAIN UNITS

This application is National Stage application of PCT international patent application PCT/CN2016/087442, filed on Jun. 28, 2016 which claims the priority to Chinese Patent Application No. 201510399919.7, titled "BRAKING FORCE DISTRIBUTION METHOD AND SYSTEM OF MULTIPLE TRAIN UNITS" and filed with the State Intellectual Property Office of the People's Republic of China on Jul. 9, 2015, both of which are incorporated herein by reference in their entireties.

FIELD

The present disclosure relates to the technical field of multiple marshalling train compartments, and in particular to a braking force distribution method and system for multiple marshalling train compartments.

BACKGROUND

With the development of technology, a braking force distribution method for multiple marshalling train compartments gets more and more attention.

In the conventional art, axle loads of a part of moving axles of the multiple marshalling train compartments decrease due to the impact of axle load transfer, thereby resulting in the problem that an adhesion utilization rate of a train decreases and a total braking force is not sufficiently utilized.

Therefore, the technical problem to be solved by those skilled in the art is how to optimize the adhesion utilization to utilize the total braking force most sufficiently.

SUMMARY

An object of the present disclosure is to provide a braking force distribution method and system for multiple marshalling train compartments, to solve the problem in the conventional technology that adhesion utilization of the train decreases and a total braking force is not utilized most sufficiently since axle loads of a part of moving axles decrease due to the impact of axle load transfer. Specific technical solutions are described in the following.

A braking force distribution method for multiple marshalling train compartments includes:
determining a current train compartment of multiple target marshalling train compartments;
calculating current axle loads of axles of the current train compartment; and
distributing braking forces for the axles of the current train compartment in a positive correlation manner based on the current axle loads of the axles.

Optionally, the calculating the current axle loads of the axles of the current train compartment may include:
acquiring parameter information on the current train compartment;
calculating axle load transfer of the axles of the current train compartment based on the parameter information; and
calculating the current axle loads of the axles of the current train compartment based on the axle load transfer of the axles of the current train compartment.

Optionally, the acquiring parameter information on the current train compartment may include:
acquiring mass, a current acceleration, a current resistance, a current braking force and a structure dimension of the current train compartment.

Optionally, the calculating the axle load transfer of the axles of the current train compartment based on the parameter information may include:
calculating a front coupler acting force, a rear coupler acting force and gravity of the current train compartment based on the mass, the current acceleration, the current resistance and the current braking force of the current train compartment; and calculating the axle load transfer of the axles of the current train compartment based on the front coupler acting force, the rear coupler acting force, the gravity and the structure dimension of the current train compartment.

Optionally, the distributing the braking forces for the axles of the current train compartment in a positive correlation manner based on the current axle loads of the axles may include:
calculating current axle load proportions of the axles; and
distributing the braking forces for the axles of the current train compartment based on the current axle load proportions of the axles.

A braking force distribution system for multiple marshalling train compartments includes:
a determination unit configured to determine a current train compartment of multiple target marshalling train compartments;
a first calculation unit configured to calculate current axle loads of axles of the current train compartment; and
a first distribution unit configured to distribute braking forces for the axles of the current train compartment in a positive correlation manner based on the current axle loads of the axles.

Optionally, the first calculation unit may include:
an acquisition unit configured to acquire parameter information on the current train compartment;
a second calculation unit configured to calculate axle load transfer of the axles of the current train compartment based on the parameter information; and
a third calculation unit configured to calculate current axle loads of the axles of the current train compartment based on the axle load transfer of the axles of the current train compartment.

Optionally, the parameter information acquired by the acquisition unit may include: mass, a current acceleration, a current resistance, a current braking force and a structure dimension of the current train compartment.

Optionally, the second calculation unit may include:
a fourth calculation unit configured to calculate a front coupler acting force, a rear coupler acting force and gravity of the current train compartment based on the mass, the current acceleration, the current resistance and the current braking force of the current train compartment; and
a fifth calculation unit configured to calculate the axle load transfer of the axles of the current train compartment based on the front coupler acting force, the rear coupler acting force, the gravity and the structure dimension of the current train compartment.

Optionally, the first distribution unit may include:
a sixth calculation unit configured to calculate current axle load proportions of the axles; and
a second distribution unit configured to distribute braking forces for the axles of the current train compartment based on the current axle load proportions of the axles.

In a braking force distribution method for multiple marshalling train compartments provided by the present disclosure, a current train compartment of multiple target marshalling train compartments is determined firstly, current axle loads of axles of the current train compartment are calculated secondly, and finally, braking forces are distributed for the axles of the current train compartment in a positive correlation manner based on the current axle loads of the axles. In the present disclosure, the braking forces are distributed for the axles by using an axle load compensation technology. In this way, a braking force generated by an axle with a small axle load is reduced based on a load-decreasing amount of the axle load, while a braking force generated by an axle with a great axle load is increased based on a load-increasing amount of the axle load, so that the braking forces generated by the axles match the respective axle loads, thereby optimizing adhesion utilization and ensuring optimal utilization of a total braking force.

BRIEF DESCRIPTION OF THE DRAWINGS

The drawings to be used in the descriptions of embodiments of the disclosure are described briefly as follows, so that technical solutions according to the embodiments of the disclosure may become clearer. Apparently, the drawings in the following descriptions only illustrate some embodiments of the disclosure. For those skilled in the art, other drawings may be obtained based on these drawings without any creative work.

FIG. 2 is a schematic structural diagram illustrating global stress analysis of a current train compartment according to the present disclosure;

FIG. 3 is a flow chart of a braking force distribution method for multiple marshalling train compartments according to another embodiment of the present disclosure;

DETAILED DESCRIPTION OF THE EMBODIMENTS

The technical solutions according to embodiments of the present disclosure will be described clearly and completely as follows in conjunction with the accompany drawings in the embodiments of the present disclosure. It is clear that the described embodiments are only a few rather than all of the embodiments according to the present disclosure. All the other embodiments obtained by those skilled in the art based on the embodiments in the present disclosure without any creative work fall within the scope of protection of the present application.

Figure 1:
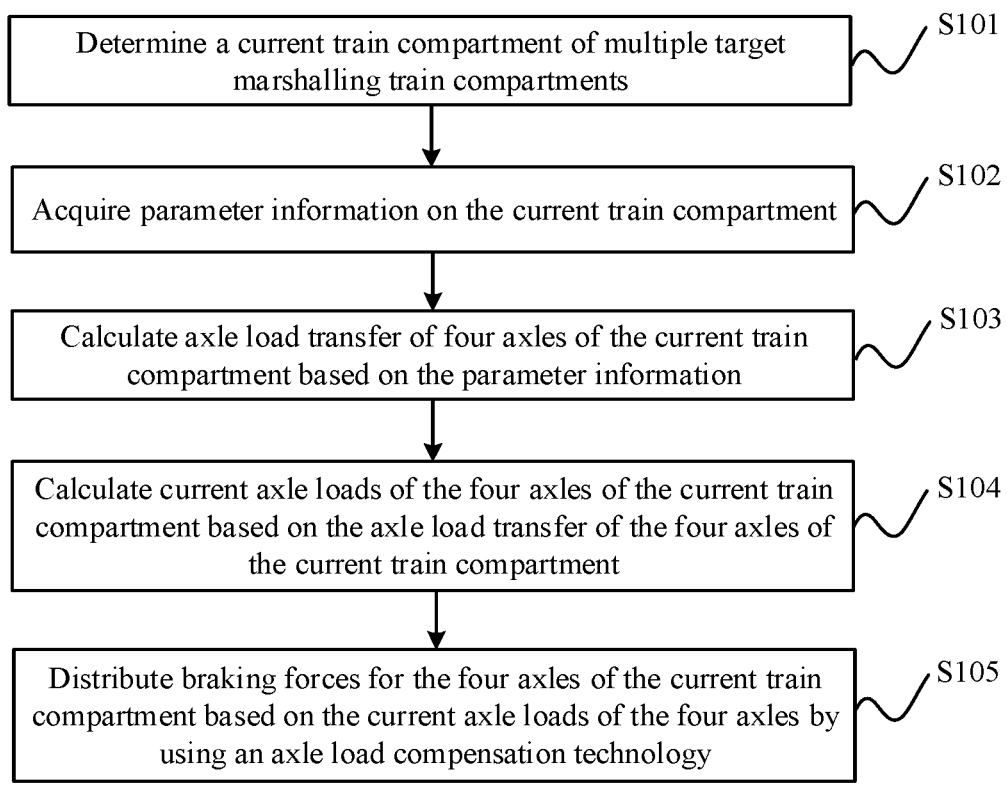
FIG. 1 is a flow chart of a braking force distribution method for multiple marshalling train compartments according to an embodiment of the present disclosure.

Reference is made to FIG. 1, which is a flow chart illustrating a braking force distribution method for multiple marshalling train compartments according to an embodiment of the present disclosure. The method may include the following steps S101-S105.

In step S101, a current train compartment of multiple target marshalling train compartments is determined.

The multiple marshalling train compartments are composed of multiple train compartments, and all or a part of the train compartments have braking capacity. A braking force may include one or more of an electric braking force, an air braking force, a magnetic track braking force and the like.

The multiple marshalling train compartments generally include multiple train compartments, and stress conditions of the multiple train compartments are different. In this case, the current train compartment is to be determined firstly and the current train compartment is analyzed subsequently when analyzing the train.

In step S102, parameter information on the current train compartment is acquired.

In the present disclosure, the process of acquiring parameter information on the current train compartment includes: acquiring mass, a current acceleration, a current resistance, a current braking force and a structure dimension of the current train compartment.

In the present disclosure, a train speed may be obtained by a speed sensor arranged on each moving axle or traction motor. A train deceleration may be obtained by performing differential calculation on the train speed by a controller. The mass of each train compartment may be obtained by a train weighing system. The braking force of each train compartment may be calculated by a brake control unit. The resistance of each train compartment may be calculated by a resistance formula for the train based on the train speed and the mass of each train compartment. Therefore, these variables are known.

In step S103, axle load transfer of axles of the current train compartment is calculated based on the parameter information.

In the present disclosure, when calculating the axle load transfer of the axles of the current train compartment, cases that the train is in a static state and in a braking state are generally considered. The axle load transfer of the axles of the current train compartment is calculated according to parameters of the respective train compartment under the static state and the braking state.

In step S104, current axle loads of the axles of the current train compartment are calculated based on the axle load transfer of the axles of the current train compartment.

In step S105, braking forces are distributed for the axles of the current train compartment based on the current axle loads of the axles by using an axle load compensation technology.

In the present disclosure, the braking force distribution method for the axles of the current train compartment is optimized based on the current axle loads of the axles by using the axle load compensation technology. In a case that the axle load transfer of the axle is great, the axle load of the current axle decreases, and the braking force distributed to the current axle is decreased. Conversely, in a case that the axle load transfer of the axle is small, the axle load of the current axle increases, and the braking force distributed to the current axle is increased. In this way, sliding of the axles is prevented, and a total braking force is utilized most sufficiently.

According to the braking force distribution method for multiple marshalling train compartments provided by the present disclosure, the braking forces are distributed for the axles by using the axle load compensation technology. In this way, a braking force generated by an axle with a small axle load is reduced based on a load-decreasing amount of the axle load, while a braking force generated by an axle with a great axle load is increased based on a load-increasing amount of the axle load, so that the braking forces generated by the axles match the respective axle loads, thereby optimizing adhesion utilization and ensuring optimal utilization of the total braking force.

In the present disclosure, vertical forces of the train are transferred through a spring between a wheelset and a bogie and a spring between a bogie and a train body. Horizontal forces of the train are transferred through an axle box of moving wheels and a central support.

In the present disclosure, it is assumed that wheel circumferential braking forces generated by the axles of the train compartment are the same.

In a case that the target train is in a static state, gravity of the current train compartment is calculated according to mass of the current train compartment. Each of the axle loads of four axles of the current train compartment is a quarter of the gravity.

Referring to FIG. 2, when a train is in a static state, both a front coupler acting force and a rear coupler acting force of the current train compartment are zero. Thus, an axle load $P_i$ is distributed to wheels evenly, and the axle load distributed to each wheel is equal to a reaction force $N_i$ of steel rails and is a quarter of gravity $G_i$ of the train compartment. That is:

$$N_1 = N_2 = N_3 = N_4 = \frac{G_i}{4}$$

When the target train is in a braking state, as shown in FIG. 3, the process of calculating axle load transfer of the axles of the current train compartment based on the parameter information includes the following steps S301 to S302.

In step S301, a front coupler acting force, a rear coupler acting force and gravity of the current train compartment are calculated based on mass, a current acceleration, a current resistance, and a current braking force of the current train compartment.

In step S302, axle load transfer of the axles of the current train compartment is calculated based on the front coupler acting force, the rear coupler acting force, the gravity and the structure dimension of the current train compartment.

Multiple train compartments may be marshalled in multiple manners. Generally, six train compartments are marshalled as one group. In the present disclosure, illustrations are made by taking a subway train including six train compartments as an example, and other marshalling manners for the multiple train compartments may be obtained by analogy.

Figure 4:
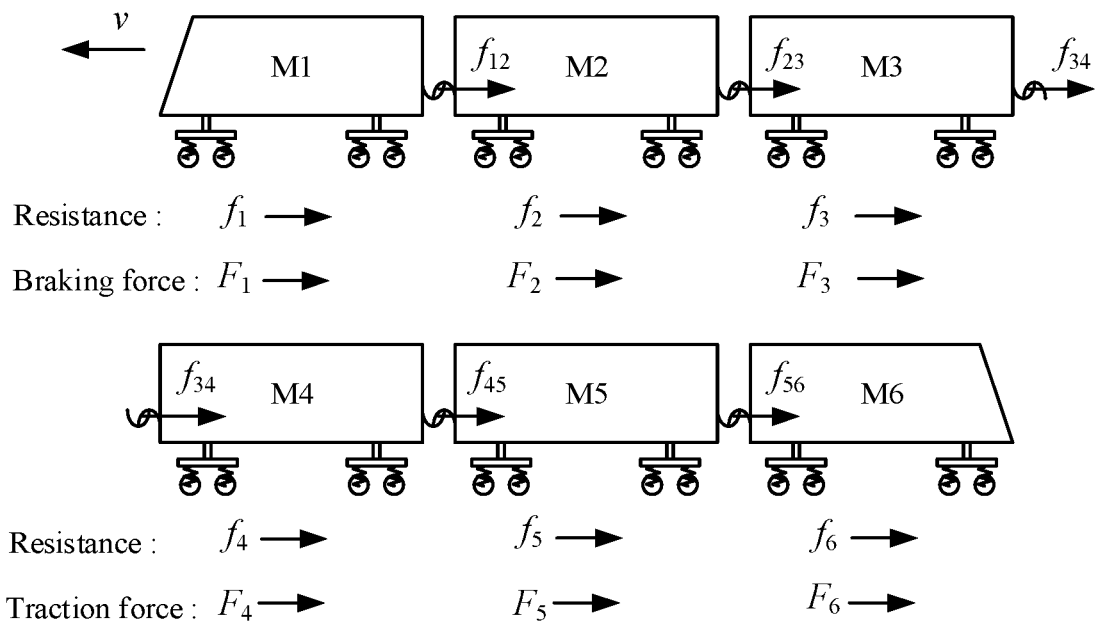
FIG. 4 is a schematic structural diagram illustrating global stress analysis of a train according to the present disclosure.

Reference is made to FIG. 4, which is a schematic diagram illustrating stress analysis of a subway train including six train compartments. Meaning of variables in the figure is listed as follows.

M1, M2, . . . , M6 denote numbers of train compartments; $f_1, f_2, \ldots, f_6$ denote resistances of the train compartments; $F_1, F_2, \ldots, F_6$ denote braking forces of the train compartments; $f_{12}$, f23, . . . , f56 denote coupler forces between adjacent train compartments; $m_1, m_2, \ldots, m_6$ denote mass of the train compartments; v denotes a speed of the train; and a denotes an acceleration of the train.

A front coupler acting force and a rear coupler acting force of each train compartment may be obtained according to Newton's second law and stress analysis of the train compartment, as shown in the following formulas (1)-(5):

$$f_{12} = m_1 a - f_1 - F_1 \tag{1}$$

$$f_{23} = m_2 a + f_{12} - F_2 - f_2 \tag{2}$$

$$f_{34} = m_3 a + f_{23} - F_3 - f_3 \tag{3}$$

$$f_{45} = m_4 a + f_{34} - F_4 - f_4 \tag{1}$$

$$f_{56} = m_5 a + f_{45} - F_5 - f_5 \tag{1}$$

A coupler acting force between adjacent train compartments may be calculated based on the above formulas (1)-(5), and a direction of the coupler acting force is defined as backward relative to the front train compartment in FIG. 4. Actually, as a head train compartment, an air resistance of M1 is great, and an actual direction of a rear coupler force $f_{12}$ is forward relative to the front train compartment, thus $f_{12}$ is negative.

A front coupler acting force and a rear coupler acting force of an i-th train compartment in multiple train compartments marshalled in any manner may be derived according to the formulas (1)-(5), as shown by the following formulas (6) and (7):

$$f_{(i-1)i} = (m_1 + m_2 + \ldots + m_{i-1})a - (F_1 + F_2 + \ldots + F_{i-1}) - (f_1 + f_2 + \ldots + f_{i-1}) \tag{6}$$

$$f_{i(i+1)} = (m_1 + m_2 + \ldots + m_i)a - (F_1 + F_2 + \ldots + F_i) - (f_1 + f_2 + \ldots + f_i) \tag{7}$$

Figure 5:
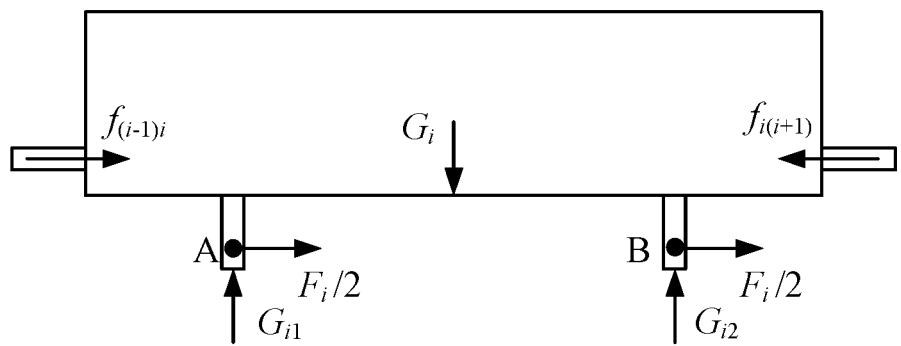
FIG. 5 is a schematic structural diagram illustrating stress analysis of a current train compartment according to the present disclosure.
Figure 6:
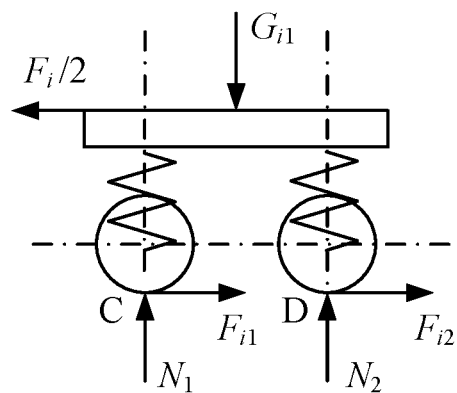
FIG. 6 is a schematic structural diagram illustrating stress analysis of axles of a current train compartment according to the present disclosure.

In the present disclosure, current axle loads of four axles of a current train compartment are calculated according to axle load transfer of the four axles of the current train compartment. In a braking state, stress conditions of a train body and a bogie are shown in FIGS. 5 and 6. Taking the train body as an isolator, a moment equation of a point B is:

$$f_{(i-1)i}(H-h) - f_{i(i+1)}(H-h) + G_{i1}L - G_i\frac{L}{2} = 0; \tag{9}$$

equation (10) may be obtained from the equation (9), $$G_{i1} = \frac{G_i}{2} - \frac{(f_{(i-1)i} - f_{i(i+1)})(H-h)}{L} \tag{10}$$

Similarly, the following formula may be obtained from a moment equation of a point A:

$$G_{i2} = \frac{G_i}{2} + \frac{(f_{i(i-1)} - f_{(i+1)i})(H-h)}{L} \tag{11}$$

It can be known from formulas (10) and (11), when $f_{i(i-1)} > f_{(i+1)i}$, a front bogie decreases a load and a rear bogie increases a load under the action of the braking force and the coupler force.

Taking the front bogie as an isolator, a moment equation of a point D is:

$$-2F_i h - G_{i1}\frac{l}{2} + N_1 l = 0 \tag{12}$$

equation (13) may be obtained from the equation (12), $$N_1 = \frac{G_{i1}}{2} + \frac{F_i h}{2l} \tag{13}$$

Similarly, the following formula may be obtained from a moment equation of a point C:

$$N_2 = \frac{G_{i1}}{2} - \frac{F_i h}{2l} \qquad (14)$$

It can be known from formulas (13) and (14) that, a front wheelset increases a load and a rear wheelset decreases a load for a same bogie.

By substituting the formula (10) into the formulas (13) and (14), the following formulas may be obtained:

$$N_1 = \frac{G_i}{4} - \frac{(f_{i(i-1)} - f_{(i+1)i})(H-h)}{2L} + \frac{F_i h}{2l} \qquad (15)$$

$$N_2 = \frac{G_i}{4} - \frac{(f_{i(i-1)} - f_{(i+1)i})(H-h)}{2L} - \frac{F_i h}{2l} \qquad (16)$$

Similarly, the following formulas may be obtained:

$$N_3 = \frac{G_i}{4} + \frac{(f_{i(i-1)} - f_{(i+1)i})(H-h)}{2L} + \frac{F_i h}{2l} \qquad (17)$$

$$N_4 = \frac{G_i}{4} + \frac{(f_{i(i-1)} - f_{(i+1)i})(H-h)}{2L} - \frac{F_i h}{2l} \qquad (18)$$

In the present disclosure, the process of distributing braking forces for axles of the current train compartment based on the current axle loads of the axles by using an axle load compensation technology includes: distributing braking forces for the axles of the current train compartment based on current axle load proportions of the axles.

When the train is in a braking state and the current axle load transfer of four axles of the current train compartment changes, the current axle loads of the four axles change accordingly. In this case, the braking forces may be distributed to the four axles based on the current axle load proportions of the four axles, that is:

$$F_{i1}:F_{i2}:F_{i3}:F_{i4} = N_1:N_2:N_3:N_4 \qquad (19)$$

By substituting the formulas (15)-(18) into the formula (19), a final braking force distribution scheme that can optimize adhesion utilization is obtained.

Figure 7:
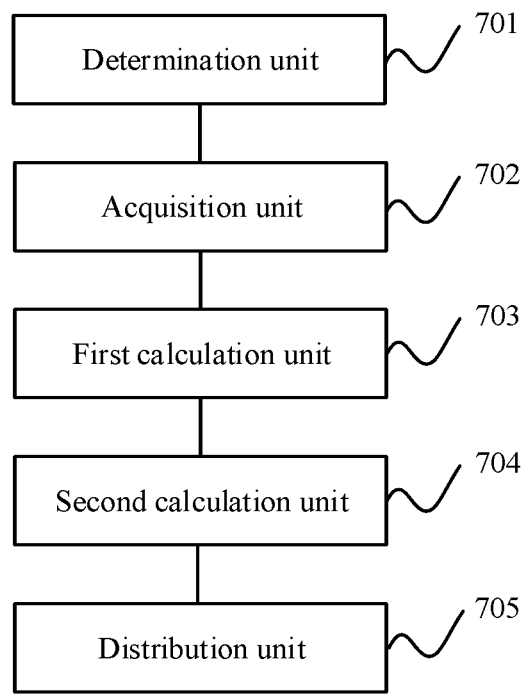
FIG. 7 is a schematic diagram of a braking force distribution system for multiple marshalling train compartments according to an embodiment of the present disclosure.

Corresponding to the braking force distribution method for multiple marshalling train compartments according to embodiments of the present disclosure, a braking force distribution system for multiple marshalling train compartments is further provided according to an embodiment of the present disclosure, as shown in FIG. 7. In this embodiment, the system includes: a determination unit 701, an acquisition unit 702, a first calculation unit 703, a second calculation unit 704 and a distribution unit 705.

The determination unit 701 is configured to determine a current train compartment of multiple target marshalling train compartments.

The acquisition unit 702 is configured to acquire parameter information on the current train compartment.

The first calculation unit 703 is configured to calculate axle load transfer of axles of the current train compartment based on the parameter information.

The second calculation unit 704 is configured to calculate current axle loads of the axles of the current train compartment based on the axle load transfer of the axles of the current train compartment.

The distribution unit 705 is configured to distribute braking forces for the axles of the current train compartment based on the current axle loads of the axles by using an axle load compensation technology.

In the present disclosure, the parameter information acquired by the acquisition unit includes: mass, a current acceleration, a current resistance, a current braking force and a structure dimension of the current train compartment.

The first calculation unit includes: a third calculation unit and a fourth calculation unit.

The third calculation unit is configured to calculate a front coupler acting force, a rear coupler acting force and gravity of the current train compartment based on the mass, the current acceleration, the current resistance, and the current braking force of the current train compartment.

The fourth calculation unit is configured to calculate axle load transfer of the axles of the current train compartment based on the front coupler acting force, the rear coupler acting force, the gravity and the structure dimension of the current train compartment.

It should be noted that, the embodiments in the specification are described in a progressive way, and each embodiment emphasizes the differences from other embodiments, and the same or similar contents of the embodiments may be referred to each other. Since the system disclosed by the embodiments corresponds to the method disclosed by the embodiments, the description of the system is brief, and for relevant matters, references may be made to the description of the method.

Finally, it should be noted that, a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to be non-exclusive, so that a process, a method, an article or a device including a series of factors not only includes the factors, but also includes other factors not explicitly listed, or also includes inherent factors of the process, the method, the article or the device. Without more limitation, a factor defined by a sentence "include one . . . " does not exclude a case that there is also another same factor in the process, the method, the article or the device including the described factors.

For the convenience of description, the system is described as units with various functions. Practically, the functions of the units may be realized via a same or multiple software and/or hardware when the present disclosure is implemented.

According to the description in the above embodiments, those skilled in the art may clearly understand that the present disclosure may be implemented by software and a necessary general-purpose hardware platform. Based on such understanding, technical solutions in the present disclosure, or the part that makes a contribution to the conventional technology in the present disclosure may be reflected in a form of a software product. The software product may be stored in a storage medium such as a ROM/RAM, a magnetic disk, and an optical disc. The software product includes multiple instructions to control a computer device (which may be a personnel computer, a server, or a network device and so on) to execute the method described in the embodiments or parts of the embodiments in the present disclosure.

The braking force distribution method and system for multiple marshalling train compartments provided by the present disclosure are described in detail above, and specific examples are used to illustrate principles and implementations of the present disclosure. The embodiments above are only to help understanding methods and core concepts of the present disclosure. Meanwhile, modifications may be made on the specific implementations and application scope according to the concepts of the present disclosure. In summary, the specification should not be deemed as limitations to the present disclosure.

The invention claimed is:

1. A braking force distribution method for a plurality of marshalling train compartments, comprising:
   determining a current train compartment of a plurality of target marshalling train compartments;
   acquiring parameter information on the current train compartment, wherein the parameter information acquired comprises: mass, a current acceleration, a current resistance, a current braking force and a structure dimension of the current train compartment;
   calculating axle load transfer of axles of the current train compartment based on the parameter information, comprising: calculating a front coupler acting force, a rear coupler acting force and gravity of the current train compartment based on the mass, the current acceleration, the current resistance and the current braking force of the current train compartment and calculating the axle load transfer of the axles of the current train compartment respectively based on the front coupler acting force, the rear coupler acting force, the gravity and the structure dimension of the current train compartment;
   calculating current axle loads of the axles of the current train compartment based on the axle load transfer of the axles of the current train compartment; and
   distributing braking forces respectively for the axles of the current train compartment in a positive correlation manner based on the current axle loads of the axles.

2. The method according to claim 1, wherein the distributing the braking forces respectively for the axles of the current train compartment in a positive correlation manner based on the current axle loads of the axles comprises:
   calculating current axle load proportions of the axles; and
   distributing the braking forces respectively for the axles of the current train compartment based on the current axle load proportions of the axles.

3. A braking force distribution system for a plurality of marshalling train compartments, comprising a storage medium, wherein a plurality of instructions are stored on the storage medium, and when executing the plurality of instructions, the system is configured to:
   determine a current train compartment of a plurality of target marshalling train compartments;
   acquire parameter information on the current train compartment, wherein the parameter information acquired comprises: mass, a current acceleration, a current resistance, a current braking force and a structure dimension of the current train compartment;
   calculate axle load transfer of axles of the current train compartment based on the parameter information;
   calculate current axle loads of the axles of the current train compartment based on the axle load transfer of the axles of the current train compartment; and
   distribute braking forces respectively for the axles of the current train compartment in a positive correlation manner based on the current axle loads of the axles,
   wherein in calculating the axle load transfer of the axles of the current train compartment based on the parameter information, the system is configured to:
   calculate a front coupler acting force, a rear coupler acting force and gravity of the current train compartment based on the mass, the current acceleration, the current resistance and the current braking force of the current train compartment; and
   calculate the axle load transfer of the axles of the current train compartment respectively based on the front coupler acting force, the rear coupler acting force, the gravity and the structure dimension of the current train compartment.

4. The system according to claim 3, wherein in distributing the braking forces respectively for the axles of the current train compartment in a positive correlation manner based on the current axle loads of the axles, the system is configured to: calculate current axle load proportions of the axles; and distribute braking forces respectively for the axles of the current train compartment based on the current axle load proportions of the axles.

* * * * *